May 9, 1933. H. F. FOX 1,908,136

ADJUSTABLE SUPPORT FOR X-RAY CASSETTES

Filed Dec. 22, 1930     2 Sheets-Sheet 1

INVENTOR
Hugh F. Fox,
BY George D. Richards
ATTORNEY

May 9, 1933.  H. F. FOX  1,908,136
ADJUSTABLE SUPPORT FOR X-RAY CASSETTES
Filed Dec. 22, 1930  2 Sheets-Sheet 2

INVENTOR
Hugh F. Fox,
BY George D. Richards
ATTORNEY

Patented May 9, 1933

1,908,136

UNITED STATES PATENT OFFICE

HUGH F. FOX, OF NEWARK, NEW JERSEY

ADJUSTABLE SUPPORT FOR X-RAY CASSETTES

Application filed December 22, 1930. Serial No. 503,940.

This invention relates, generally, to X-ray photography; and the invention has reference, more particularly, to a novel adjustable support for holding the cassette used in taking X-ray photographs.

Heretofore, in taking X-ray photographs and especially photographs of the teeth and portions of the head, it has been common for either the patient or the physician to manually support the cassette in the desired position while a picture is being taken. This practice is undesirable because of the inherent tendency of the human hand to move or vibrate slightly so that the cassette during the exposure is not rigidly supported, with the result that the picture produced is more or less indefinite in outline and consequently of uncertain value. At times physicians have placed the cassette on a table or stand adjacent the chair in which the patient is sitting and the patient has held his head or other member to be photographed adjacent the cassette. In this case the cassette is held stationary but the head of the patient, being bent over or held in an unnatural position so as to be near the cassette, is apt to move more or less during the taking of the picture with the result that the same is indefinite and inaccurate.

The principal object of the present invention is to provide a novel adjustable support for rigidly supporting the X-ray cassette in any desired position with respect to the patient while a picture is being taken.

Another object of the present invention lies in the provision of an adjustable support of the above character which may be readily attached to a chair or other member and which is of simple construction, the same being easily adjustable so as to position the cassette carried thereby in any position desired in the proximity of the patient, the said support acting to rigidly hold the cassette in such selected position without movement and serving also when desired to support the portion of the patient's body being photographed as when such portion of the body is rested against the cassette during the exposure to steady such body portion.

Other objects of this invention, not at this time more particularly enumerated, will be clearly understood from the following detailed description of the same.

The invention is clearly illustrated in the accompanying drawings, in which:—

Similar characters of reference are employed in all of the above described views, to indicate corresponding parts.

Figures 1, 2:
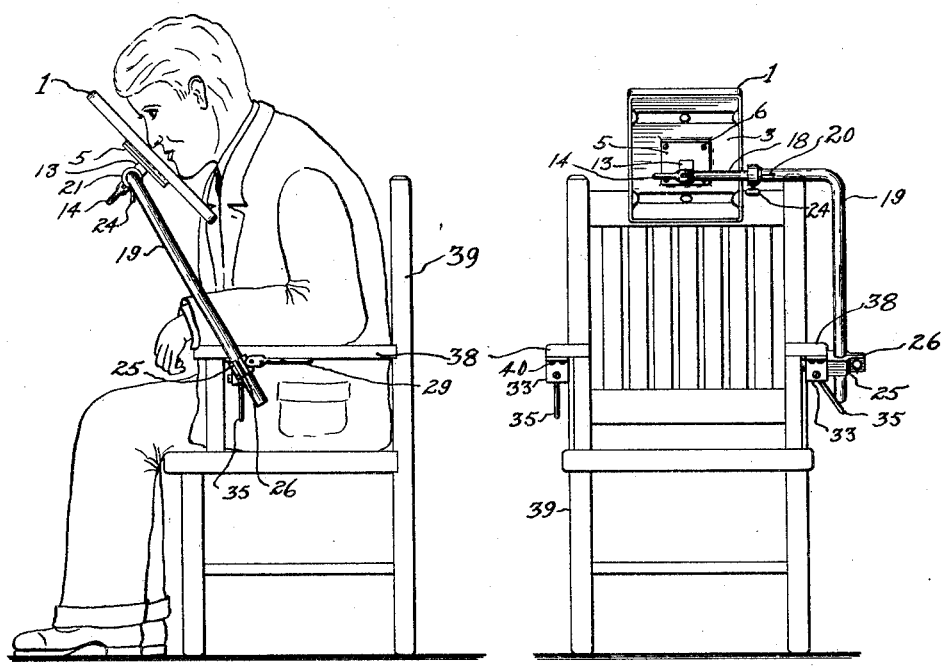
Fig. 1 is a view in side elevation showing the novel adjustable support of this invention applied to a chair and illustrating the manner of using the said support.
Fig. 2 is a view in front elevation of the structure shown in Fig. 1.
Figure 3:
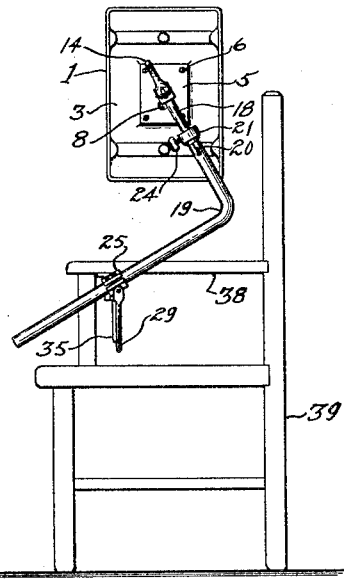
Fig. 3 is a view similar to Fig. 1 but illustrates the cassette held in a different position.
Figure 4:
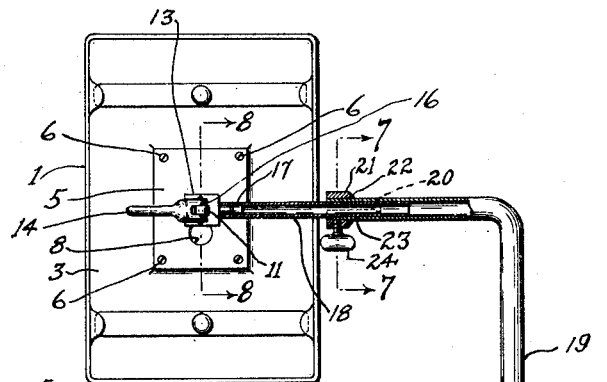
Fig. 4 is an enlarged view with parts broken away of the adjustable support and the cassette held thereby.
Figures 5, 6:
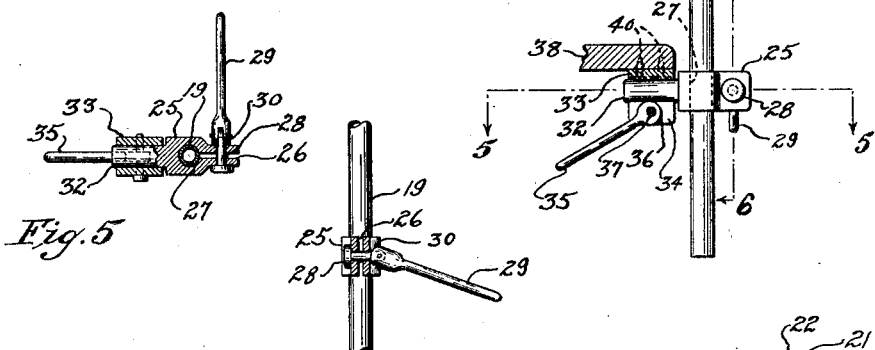
Fig. 5 is a sectional view taken along line 5—5 of Fig. 4 looking in the direction of the arrows.
Fig. 6 is a sectional view taken along line 6—6 of Fig. 4 looking in the direction of the arrows.
Figure 7:
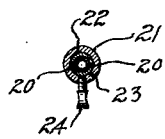
Fig. 7 is a sectional view taken along line 7—7 of Fig. 4 looking in the direction of the arrows.

Referring now to said drawings, the reference numeral 1 designates an X-ray cassette having a front wall 2 and a removable rear wall 3. A photographic film 4 is adapted to be held intermediate the front and rear walls 2 and 3 as is well known to those skilled in the art. During the taking of an X-ray picture, it is necessary to hold the cassette 1 adjacent the portion of the body being photographed, as especially illustrated in Fig. 1, and the novel adjustable support of this invention serves to rigidly hold the cassette in such desired position without movement and also provides a means for supporting or steadying the portion of the body being photographed when such portion is rested against the cassette, as shown in Fig. 1.

Figures 8, 9:
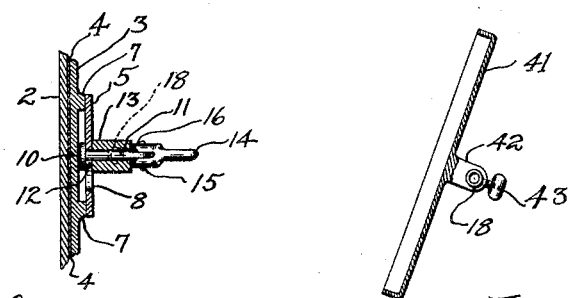
Fig. 8 is a sectional view taken along line 8—8 of Fig. 4 looking in the direction of the arrows.
Fig. 9 is a sectional view of a slightly modified construction.

According to the preferred arrangement, the novel adjustable support of this invention comprises a plate member 5 which is adapted to be attached, as by screws 6, to the rear wall 3 of the cassette. The central portion of the plate member 5 should be spaced slightly from the rear surface of the rear wall 3 to provide for the insertion of the head 10 of a pin 11 therebetween, as especially illustrated in Fig. 8. To provide for this spacing of the plate member 5 from the rear wall 3, this rear wall is illustrated as formed with a projecting flange 7 which is adapted to underlie the marginal edge portions of the plate member 5 as especially shown in Fig. 8. It will be apparent, however, that the flange 7 may as well be formed on the plate member 5 if desired.

Plate member 5 is formed with a circular aperture 8 through which the circular head 10 of the pin 11 is adapted to pass. Plate member 5 is also provided with a slot 12 which communicates with the aperture 8. Slot 12 is of sufficient width to receive the shank of pin 11. The shank of pin 11 is longitudinally slidable within an aperture provided in a supporting block 13. The shank of pin 11 projects exteriorly of supporting block 13 and has the bifurcated end portion of a lever 14 pivotally connected thereto as by pin 15. The bifurcated end portion of the lever 14 has a curved camming surface 16 at its end for engaging one side of the block 13. By manipulating lever 14 the head 10 of pin 11 may be moved toward or away from the opposite side of the block 13. When the head 10 has been passed through aperture 8 of the plate member 5 and the shank of pin 11 moved into slot 12, the lever 14 may be manipulated to cause the head 10 of pin 11 to grip the plate member 5 between this head and the other side of block 13, thereby firmly securing the cassette to the supporting block 13.

Supporting block 13 is formed with a projection 17 which is fixedly secured within one end portion of a tube 18. The other end portion of tube 18 extends into an upper or shorter leg of a tube 19 bent into right angle shape. The shorter leg of tube 19 is diametrically split at 20 for a distance extending inwardly from the free end of this shorter leg. A collar 21 surrounds the free end of the shorter leg of tube 19 and is secured as by welding, brazing or soldering to the upper half end portion 22 of the shorter leg. The lower half end portion 23 of the shorter leg is not secured to collar 21 and is adapted to be pressed into gripping engagement with tube 18 by a thumb screw 24 threaded through the wall of collar 21 and engaging the lower half end portion 23.

The diametrical split or slot 20 permits motion of the lower half end portion 23 toward the upper half end portion 22. By loosening the thumb screw 24, tube 18 is freed and may be moved longitudinally with respect to the shorter leg of tube 19 and may also be turned angularly with respect to this leg into any position desired, whereupon the thumb screw 24 may again be tightened to secure the tube 18 in such desired position.

The longer leg of the right angle tube 19 extends through a conforming aperture 27 provided in a clamp block 25. The clamp block 25 is split or slotted at 26, which slot extends from one end of the clamp block to the conforming aperture 27. The side portions of the clamp 25 adjacent the slot 26 are adapted to be drawn together by means of a headed pin 28 and a bifurcated camming lever 29 to cause the clamp block to grip the long leg of tube 19. The bifurcated end portion of camming lever 29 is pivotally connected to the shank of pin 28, and this bifurcated end portion is provided with a curved camming surface 30 for engagement with the clamp block, which camming surface cooperates with the head of pin 28 to draw the side portions of the clamp block together to effect the gripping of tube 19 when desired. By releasing lever 29, the longer leg of tube 19 may be moved longitudinally or angularly with respect to aperture 27. By again tightening lever 29, the longer leg of tube 19 will be held in any desired position.

Clamp block 25 is formed with a cylindrical projection 32 disposed opposite to the slot 26. Projection 32 is adapted to removably extend into a cylindrical aperture provided in a bracket 33. Bracket 33 is also provided with a slot 34 which communicates with the cylindrical aperture therein. A lever 35 has a cam portion 36 positioned within the slot 34 and is pivotally mounted as on a screw 37, carried by the bracket 33. By turning handle 35 the cam portion 36 may be caused to grip the cylindrical projection 32 to thereby hold the clamp block 25 rigidly to bracket 33. Bracket 33 is adapted to be secured, as by screws 40, to a suitable support such as the arm 38 of a chair 39. In practice two of the brackets 33 would be employed, one being secured to one arm of the chair 39 and the other being secured to the other arm of this chair as especially shown in Fig. 2.

In use, the novel adjustable support of this invention enables the physician or operator to move the cassette to any position desired about the chair 39. To attach the cassette to the adjustable support, it is merely necessary to insert the head 10 of pin 11 through aperture 8 in plate member 5 and then to move the shank of pin 11 into slot 12 and turn lever 14 to on or tightened position, thereby locking the plate member and hence the cassette to supporting block 13. It will be evident that the cassette may be turned angularly about the axis of pin 11 to any angle desired before hand lever 14 is tightened. By loosening thumb screw 24 the tube 18 may be adjusted longitudinally or angularly with respect to the short leg of right angle tube 19. Also, by releasing lever 29 the long leg of right angle tube 19 may be moved longitudinally or turned angularly with respect to clamp block 25, and by releasing lever 35 the right angle tube and clamp block 25 may be turned angularly with respect to bracket 33. Thus a universal support is provided for the cassette, thereby enabling the ready adjustment or movement of the cassette to any position desired. The cylindrical extension 32 of clamp block 25 may be readily attached to either of the brackets 33 on the arms 38 of the chair 39, whereby pictures of any part of the body may be taken from the front, back or sides, whichever is most desirable. The patient may rest the member or body portion being photographed against the cassette as illustrated in Fig. 1, if desired, to prevent possible movement of the body portion during the film exposure.

It will be noted that the novel adjustable support of the present invention eliminates several sources of inaccuracy in the taking of X-ray pictures. By holding the cassette absolutely stationary indefiniteness of picture outline caused by a slightly moving manually held cassette is eliminated. Also, by enabling the patient to rest the body member being photographed against the cassette, a sharper picture is formed and indefiniteness resulting from slight movement of the body member is eliminated.

It will be noted that the novel adjustable support of this invention is of extremely simple construction and is easily operated to secure any adjustment desired. The use of the right angle tube 19 is especially desirable because it is this tube which makes the universal adjustment possible.

If desired, instead of attaching the plate member 5 to the rear wall of the cassette, a tray or support 41 (see Fig. 9) may be employed for supporting the cassette, in which case the cassette may be lifted or removed from the novel support of this invention at will. Tray 41 is provided with a rearwardly directed lug 42, which lug is apertured for receiving tube 18. Tray 41 may be turned angularly about tube 18 or even slid therealong, if desired. A wing nut 43 is employed for fixedly holding tray 41 to tube 18. In use, the adjustable support is manipulated to position the tray 41 where desired, whereupon the cassette is placed in this tray for taking the exposure.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

An adjustable support for holding an X-ray cassette comprising a bracket arranged to be secured to a chair or other structure, said bracket having a receiving aperture therein, a clamp member having a projection extending into said receiving aperture, said projection being angularly adjustable within said receiving aperture, a tube having two legs disposed at right angles to one another, said clamp member having an aperture therein and conformably receiving one leg of said tube, said leg being longitudinally adjustable with respect to the aperture of said clamp member, a second tube telescopically fitting into the other leg of said first tube, said second tube being longitudinally and angularly adjustable with respect to said other leg, said other leg having a diametrically split end portion, a collar surrounding said split end portion and secured to one half of such end portion, a screw threaded through said collar and engaging the other half of said split end portion for pressing said other half into frictional engagement with said second named tube, whereby the latter is held in adjusted position with respect to said other leg, an apertured supporting plate member, a supporting block carried by said second named tube, a headed pin extending through said supporting block and adapted to have its head inserted through the aperture in said plate member, and a lever pivoted on said pin and having a cam portion engaging said supporting block for moving the head of said pin into gripping engagement with said plate member, thereby securing said plate member to said supporting block.

In testimony, that I claim the invention set forth above I have hereunto set my hand this 18th day of December, 1930.

HUGH F. FOX.